US 9,876,704 B2

(12) United States Patent
Sun et al.

(10) Patent No.: US 9,876,704 B2
(45) Date of Patent: *Jan. 23, 2018

(54) PACKET TRACING IN A SOFTWARE-DEFINED NETWORKING ENVIRONMENT

(71) Applicant: NICIRA, INC., Palo Alto, CA (US)

(72) Inventors: Keyong Sun, Beijing (CN); Maosheng Ren, Beijing (CN); Yonggang Wang, Beijing (CN); Kecheng Lu, Beijing (CN)

(73) Assignee: Nicira, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/236,471

(22) Filed: Aug. 14, 2016

(65) Prior Publication Data
US 2016/0380874 A1  Dec. 29, 2016

Related U.S. Application Data

(63) Continuation of application No. 14/226,851, filed on Mar. 27, 2014, now Pat. No. 9,419,874.

(51) Int. Cl.
*G06F 11/00* (2006.01)
*H04J 3/14* (2006.01)
(Continued)

(52) U.S. Cl.
CPC .............. *H04L 45/02* (2013.01); *H04L 41/14* (2013.01); *H04L 43/0829* (2013.01); *H04L 45/123* (2013.01); *H04L 45/64* (2013.01)

(58) Field of Classification Search
CPC ........ H04L 45/02; H04L 45/123; H04L 45/64
(Continued)

(56) References Cited

U.S. PATENT DOCUMENTS 5,224,100 A   6/1993  Lee et al.
5,245,609 A   9/1993  Ofek et al.
(Continued)

FOREIGN PATENT DOCUMENTS

JP   2002-141905    5/2002
WO   WO 95/06989    3/1995
WO   WO 2013/184846  12/2013

OTHER PUBLICATIONS

Nikhil Handigol et al., "Where is the Debugger for my Software-Defined Network?", HotSDN'12, Aug. 13, 2012, ACM.
(Continued)

*Primary Examiner* — Chuong T Ho
(74) *Attorney, Agent, or Firm* — Su IP Consulting

(57) ABSTRACT

An example method to perform packet tracing in a Software-Defined Networking (SDN) environment is provided. The SDN environment comprises an SDN controller device and a plurality of forwarding devices configurable by the SDN controller device. The method may comprise the SDN controller device configuring the plurality of forwarding devices to generate trace information of packets associated with a communication flow in the SDN environment; and receiving trace information of packets associated with the communication flow. Based on the trace information, the SDN controller device may generate aggregated trace information by identifying, from header information and payload information of the packets, particular packets associated with the communication flow that are processed by one of the plurality of forwarding devices, or a particular packet associated with the communication flow that is processed by at least two of the plurality of forwarding devices, or both.

18 Claims, 5 Drawing Sheets

(51) Int. Cl.
*H04L 1/00* (2006.01)
*H04L 12/26* (2006.01)
*H04L 12/751* (2013.01)
*H04L 12/24* (2006.01)
*H04L 12/721* (2013.01)
*H04L 12/715* (2013.01)

(58) Field of Classification Search
USPC .... 370/248, 249, 254, 241, 241.1, 247, 252, 370/253
See application file for complete search history.

(56) References Cited

U.S. PATENT DOCUMENTS

| | | | |
|---|---|---|---|
| 5,265,092 A | 11/1993 | Soloway et al. | |
| 5,781,534 A | 7/1998 | Pelman et al. | |
| 6,104,700 A | 8/2000 | Haddock et al. | |
| 6,430,160 B1 | 8/2002 | Smith et al. | |
| 6,721,334 B1 | 4/2004 | Ketcham | |
| 7,079,544 B2 | 7/2006 | Wakayama et al. | |
| 7,627,692 B2 | 12/2009 | Pessi | |
| 7,706,266 B2 | 4/2010 | Plamondon | |
| 7,760,735 B1 | 7/2010 | Chen et al. | |
| 7,808,919 B2 | 10/2010 | Nadeau et al. | |
| 7,937,492 B1 | 5/2011 | Kompella et al. | |
| 8,345,558 B2 | 1/2013 | Nicholson et al. | |
| 8,351,418 B2 | 1/2013 | Zhao et al. | |
| 8,611,351 B2 | 12/2013 | Gooch et al. | |
| 9,419,874 B2* | 8/2016 | Sun | H04L 43/0829 |
| 2005/0132044 A1 | 6/2005 | Guingo et al. | |
| 2005/0232230 A1 | 10/2005 | Nagami et al. | |
| 2006/0028999 A1 | 2/2006 | Iakobashvilli et al. | |
| 2006/0029056 A1 | 2/2006 | Perera et al. | |
| 2006/0037075 A1 | 2/2006 | Frattura et al. | |
| 2006/0206655 A1 | 9/2006 | Chappell et al. | |
| 2006/0282895 A1 | 12/2006 | Rentzis et al. | |
| 2007/0055789 A1 | 3/2007 | Claise et al. | |
| 2008/0049614 A1 | 2/2008 | Briscoe et al. | |
| 2008/0049786 A1 | 2/2008 | Ram et al. | |
| 2008/0253299 A1 | 10/2008 | Damm et al. | |
| 2009/0010254 A1 | 1/2009 | Shimada | |
| 2010/0128623 A1 | 5/2010 | Dunn et al. | |
| 2011/0317696 A1 | 12/2011 | Aldrin et al. | |
| 2012/0159454 A1 | 6/2012 | Barham et al. | |
| 2012/0287791 A1 | 11/2012 | Xi et al. | |
| 2013/0058228 A1* | 3/2013 | Koponen | H04L 12/4633 370/252 |
| 2013/0067067 A1 | 3/2013 | Miri et al. | |
| 2013/0242758 A1 | 9/2013 | Vaidya et al. | |
| 2013/0332602 A1 | 12/2013 | Nakil et al. | |
| 2014/0029451 A1 | 1/2014 | Nguyen | |
| 2014/0119203 A1 | 5/2014 | Sundaram et al. | |
| 2014/0195666 A1 | 7/2014 | Dumitriu et al. | |
| 2014/0281030 A1 | 9/2014 | Cui et al. | |
| 2015/0016298 A1* | 1/2015 | Ganichev | H04L 43/0894 370/253 |
| 2015/0103642 A1 | 4/2015 | Stuart | |
| 2015/0256397 A1* | 9/2015 | Agarwal | H04L 41/12 370/254 |
| 2015/0281036 A1 | 10/2015 | Sun et al. | |
| 2015/0281076 A1 | 10/2015 | Zhang et al. | |

OTHER PUBLICATIONS

U.S. Appl. No. 61/969,960, filed Mar. 25, 2014.
Handigol, Nikhil, et al., "Where is the Debugger for my Software-Defined Network?", HotSDN'12, Aug. 13, 2012, 6 pages, ACM, Helsinki, Finland.
Phaal, Peter, et al., "sFlow Version 5", Jul. 2004, 46 pages, available at http://www.sflow.org/sflow_version_5.txt.
Phan, Doantam, et al., "Visual Analysis of Network Flow Data with Timelines and Event Plots", Month Unknown, 2007, pp. 1-16, VizSEC.
Zhang, Hui, et al. (U.S. Appl. No. 61/969,960), filed Mar. 25, 2014.

* cited by examiner

PACKET TRACING IN A SOFTWARE-DEFINED NETWORKING ENVIRONMENT

CROSS-REFERENCE TO RELATED APPLICATION

The present application is a continuation application under 35 U.S.C. § 120 of U.S. patent application Ser. No. 14/226,851, filed on Mar. 27, 2014 and entitled "Packet tracing in a software-defined networking environment." The aforementioned U.S. Patent Application, including any appendices or attachments thereof, is hereby incorporated by reference in its entirety.

BACKGROUND

Communications networks are generally packet-switched networks that operate based on Internet Protocol (IP). Packets from a source device may travel to a destination device via paths chosen by forwarding devices connecting them. Since the forwarding devices operate independently and generally make local forwarding decisions, the path between the source and destination devices may not be the same for each packet, and may not be the same in each direction. This presents a challenge to trace packets and their paths through different forwarding devices in the network.

DETAILED DESCRIPTION

Figure 1:
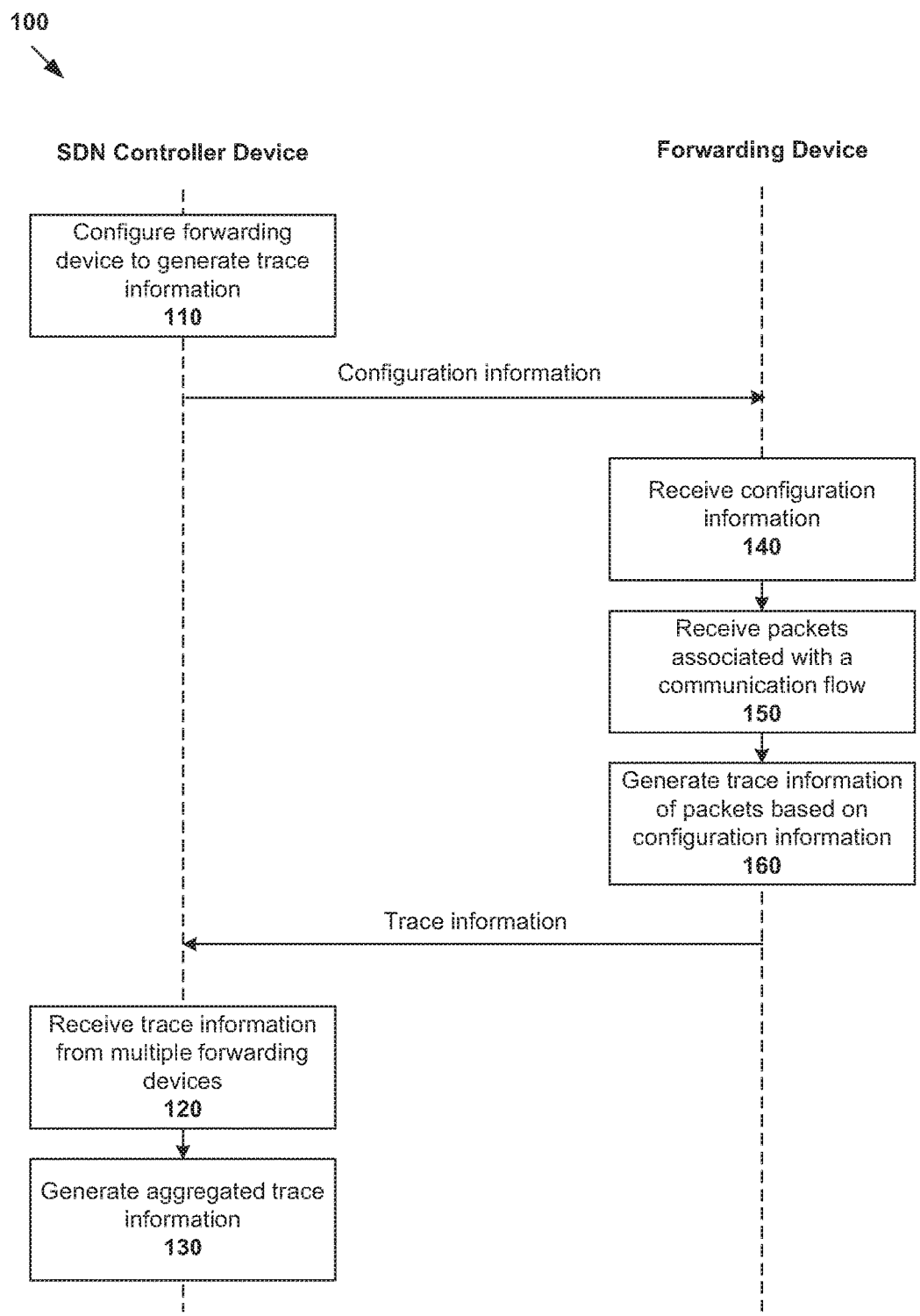
FIG. 1 is a flowchart of an example process for packet tracing in a Software-Defined Networking (SDN) environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

FIG. 1 is a flowchart of an example process 100 to perform packet tracing in a Software-Defined Networking (SDN) environment that includes an SDN controller device and multiple forwarding devices (one shown for simplicity). Example process 100 may include one or more operations, functions, or actions illustrated by one or more blocks, such as blocks 110 to 160. The various blocks may be combined into fewer blocks, divided into additional blocks, and/or eliminated based upon the desired implementation.

Referring to the SDN controller device on the left-hand side of FIG. 1: at block 110, the SDN controller device configures the forwarding devices (one shown for simplicity) to each generate trace information of packets associated with a communication flow in the SDN environment. At block 120, the SDN controller device receives, from the forwarding devices, trace information that includes header information and payload information of the packets associated with the communication flow. At block 130, based on the trace information, the SDN controller device generates aggregated trace information that identifies forwarding devices that processed a particular packet or packets processed by a particular forwarding device, or both.

Referring to the forwarding device on the right-hand side of FIG. 1: at block 140, the forwarding device receives configuration information from the SDN controller device to generate trace information of packets associated with a communication flow. At blocks 150 and 160, the forwarding device receives packets, generates trace information of packets associated with the communication flow and sends the trace information to the SDN controller device.

Unlike a conventional network, the SDN environment according to example process 100 allows logical separation between a control plane that decides how packets are forwarded, and a data plane that implements how packets are forwarded. The SDN controller device acts as the control plane and configures the forwarding devices, which act as the data plane, to generate trace information.

Since the trace information received from the forwarding devices includes both header information and payload information, the SDN controller device may generate aggregated trace information that provides a global view of how and which packets are forwarded in the SDN environment. For example, the aggregated trace information identifies forwarding devices that processed a particular packet, or packets processed by a particular forwarding device, or both. Each forwarding device may "process" a packet in any suitable manner, such as forwarding the packet to another forwarding device, forwarding the packet to the SDN controller device, forwarding the packet to a user or host in the user space, modifying the header information of the packet before forwarding it and dropping the packet, etc.

Using example process 100, the forwarding devices may be configured by the SDN controller device to generate trace information associated with any communication flow of interest. The aggregated trace information may then be used in any suitable application, such as network debugging, packet loss analysis and monitoring, network infrastructure health monitoring, network security monitoring, security policy compliance monitoring, and application network protocol analysis (e.g., Network File System (NFS)), etc.

SDN Environment

Figure 2:
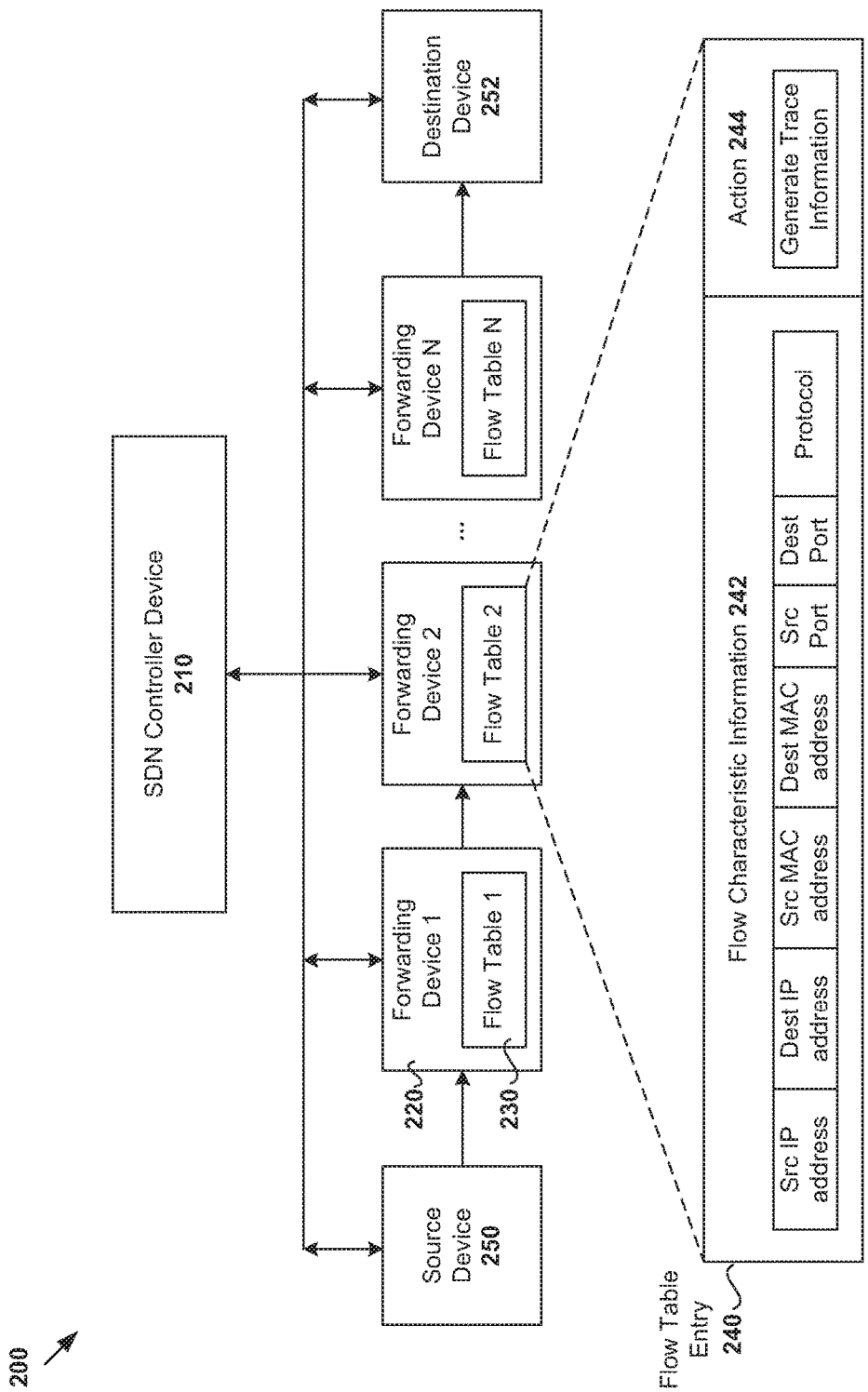
FIG. 2 is a schematic diagram of an example SDN environment in which packet tracing may be implemented.

FIG. 2 is a schematic diagram of example SDN environment 200 in which packet tracing may be implemented. SDN environment 200 includes SDN controller device 210 and multiple forwarding devices 220 (also known as "forwarding nodes", e.g., Forwarding Devices 1 to N). SDN environment 200 is designed to be flexible and can operate with different types of forwarding devices at different protocol layers. For example, each forwarding device 220 may be any suitable physical or virtual entity, such as a hypervisor, network layer router (i.e. layer 3), link layer switch (i.e. layer 2), etc. Forwarding devices 220 are generally separate entities, but any suitable implementation may be used in practice. Although an example is shown in FIG. 2, SDN environment 200 may include additional or alternative components, and may have a different configuration.

SDN controller device 210 represents the control plane that decides how packets are forwarded and what trace information to capture by forwarding devices 220 in SDN environment 200. SDN controller device 210 may also be responsible for other higher-level control functions, such as policy enforcement, security checks and naming, etc. Forwarding devices 220 represent the data plane that performs packet forwarding and generates trace information depending on configuration by SDN controller device 210.

Forwarding devices 220 each maintain a flow table 230 (e.g., Flow Table 1 at Forwarding Device 1, Flow Table 2 at Forwarding Device 2, etc.) that is configurable by SDN controller device 210. For example, SDN controller device 210 may instruct adding entries 240 to, or deleting entries 240 from, flow table 230 of forwarding device 220. Each entry 240 may include flow characteristic information 242 to be matched by forwarding device 220 against received packets, and action 244 to be performed once a match is found.

Any suitable flow characteristic information may be used to match a packet against a particular communication flow, such as fields from different protocol layers, etc. Examples include source and destination Internet Protocol (IP) addresses; source and destination Media Access Control (MAC) addresses; source and destination port numbers in a transport layer (e.g. Transmission Control Protocol (TCP) and User Datagram Protocol (UDP) port numbers); and protocol (e.g., IPv4 or IPv6 protocol number), etc.

Action 244 specifies how forwarding device 220 handles or processes a packet that matches flow characteristic information 242. For example, action 244 may be to drop the packet, forward the packet to an outgoing port, forward the packet to SDN controller device 210 and generate trace information associated with a communication flow, etc. Forwarding device 220 may also modify header information of the packet before forwarding it to another device 220, SDN controller device 210 or a user (not shown for simplicity). In FIG. 2, flow table entry 240 may further include other fields, such as priority of the entry, timeouts (i.e. maximum of idle time before a flow is expired), etc.

Entries 240 in flow table 230 may each be associated with a "communication flow", which may generally refer to a stream of packets between source device 250 and destination device 252. SDN controller device 210 decides whether a communication flow is permissible in SDN environment, such as according to network policy, etc. Although not shown in FIG. 2, there may be multiple communication flows in SDN environment 200 between different source devices 250 and destination devices 252 and each communication flow may be assigned with a different flow identifier (ID) by SDN controller device 210.

Any suitable SDN protocol may be used by SDN controller device 210 to configure forwarding devices 220 in SDN environment 200, such as OpenFlow protocol (OFP); CLIs (Command-line Interfaces); NETCONF (Network Configuration Protocol); NETCONF (Yang Schema); SNMP (Simple Network Management Protocol); XMPP (Extensible Messaging and Presence Protocol); OpenStack; virtualization software APIs (Application Programming Interfaces); OF-Config (OpenFlow Management and Configuration Protocol); and Secure Shell (SSH), etc. SDN controller device 210 and forwarding devices 220 may communicate via a secure channel.

Packet Tracing Configuration

Figure 3:
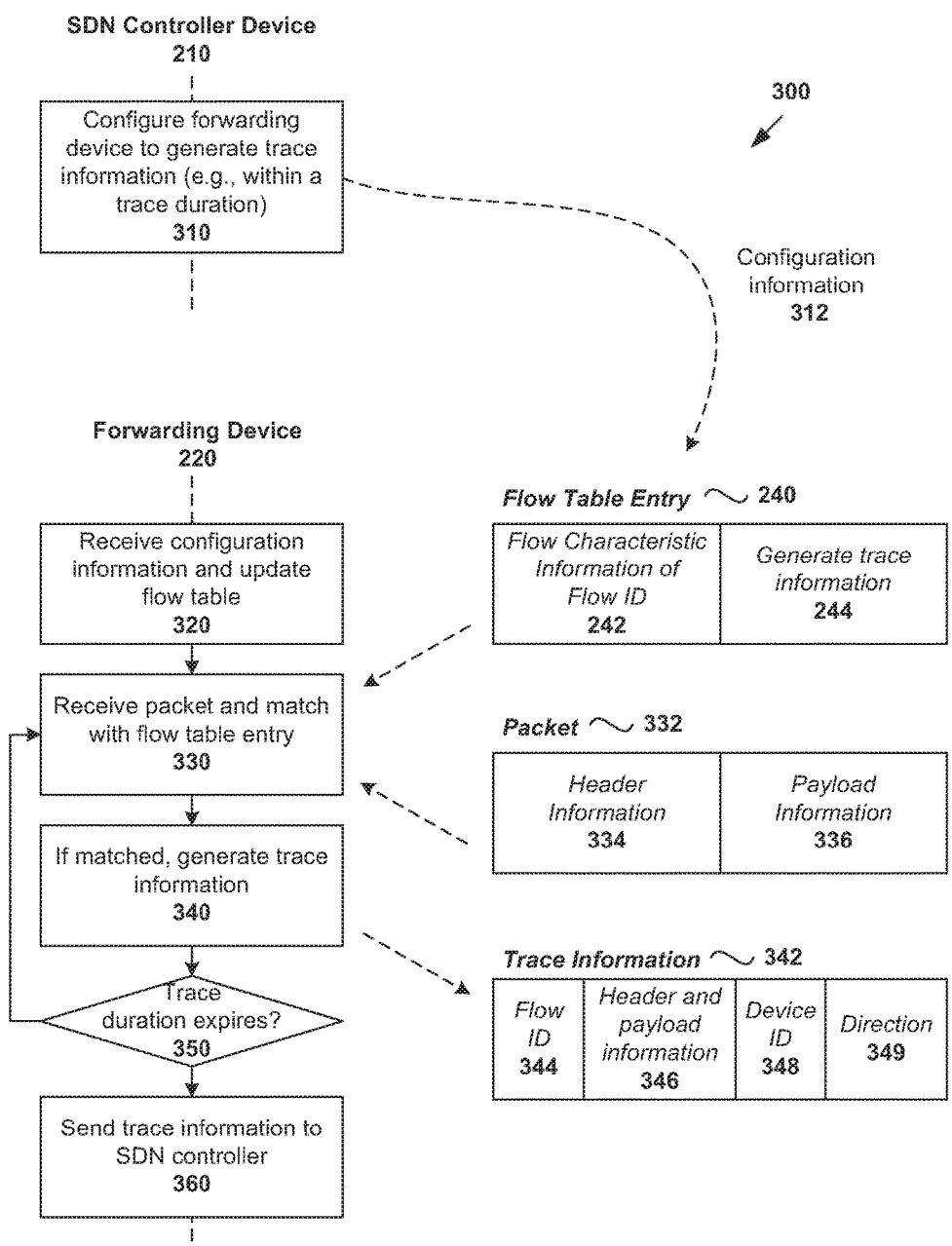
FIG. 3 is a flowchart of an example process for configuring forwarding devices to generate trace information in an SDN environment.

FIG. 3 is a flowchart of an example process 300 for configuring forwarding devices to generate trace information in SDN environment 200. Example process 300 may include one or more operations, functions, or actions illustrated by one or more blocks, such as blocks 310 to 360. The various blocks may be combined into fewer blocks, divided into additional blocks, and/or eliminated based upon the desired implementation.

At block 310 (related to 110 in FIG. 1), SDN controller device 210 configures forwarding device 220 to generate trace information. The configuration may be set up by, for example, a network manager to trace packets associated with a communication flow. In the example in FIG. 3, SDN controller device 210 performs the configuration by sending configuration information 312 to forwarding device 220 to update its flow table 230.

At block 320 (related to 140 in FIG. 1), forwarding device 220 receives configuration information 312 and updates flow table 230. In particular, forwarding device 220 adds or modifies flow table entry 240 to include flow characteristic information 242 of a communication flow (e.g., Flow 1) and action 244 to generate trace information if a packet is matched against flow characteristic information 242.

At block 310, SDN controller device 210 may also specify a trace duration in configuration information 312. In this case, forwarding device 220 will generate trace information during the trace duration and report to SDN controller device 210 after the trace duration elapses. The trace duration may be tracked by each forwarding device 220 using any suitable technique, such as setting a timer, etc. Setting the trace duration reduces the need for forwarding device 220 to report to SDN controller device 210 every time a packet is received, thereby reducing processing burden on forwarding device 220 and traffic in SDN environment 200.

At block 330 (related to 150 in FIG. 1), forwarding device 220 receives packet 332 from source device 252, or another device 220 (e.g., Forwarding Device 2 receiving packet 332 from Forwarding Device 1). Forwarding device 220 then parses and matches header information 334 of the packet 332 against flow characteristic information 242 in flow table entry 240. For example, header information 334 that may be extracted from packet 332 include source and destination IP addresses; source and destination MAC addresses; TCP or UDP port number; and IP version number, etc.

At block 340 (related to 160 in FIG. 1), in response to finding a match, forwarding device 220 generates trace information 342 and stores it locally in any suitable data structure. In the example in FIG. 3, trace information 342 includes Flow ID 344 associated with packet 332 (e.g., Flow 1); header and payload information 346 of packet 332; device ID 348 of forwarding device 220 (e.g., Forwarding Device 2); and direction 349 at which packet 332 is travelling 349. For example, direction 349 may be indicated by an outgoing port via which packet 332 is forwarded or an address (e.g., IP or MAC) of the next hop, etc.

It will be appreciated that header and payload information 346 in trace information 342 may be a copy of the corresponding header 334 and payload 336 information in packet 332. Alternatively, forwarding devices 220 may analyse packet 332 to generate an extract of the packet's header 334 and payload 336. Generating the extract, instead of an exact copy of packet 332, requires additional processing at forwarding device 220 but reduces the size of trace information 342 sent to SDN controller device 210.

At block 350 (related to 160 in FIG. 1), forwarding device 220 determines whether the trace duration set by SDN controller device 210 has elapsed. If not, forwarding device 220 repeats blocks 330 to 350 for the next received packet. Otherwise, forwarding device 220 sends trace information 342 that includes header and payload information 346 of packets associated with Flow 1 to SDN controller device 210.

Trace information 342 from forwarding devices 220 may then be used by SDN controller device 210 to generate aggregated trace information according to blocks 120 and 130 in FIG. 1.

Aggregated Trace Information

Figure 4:
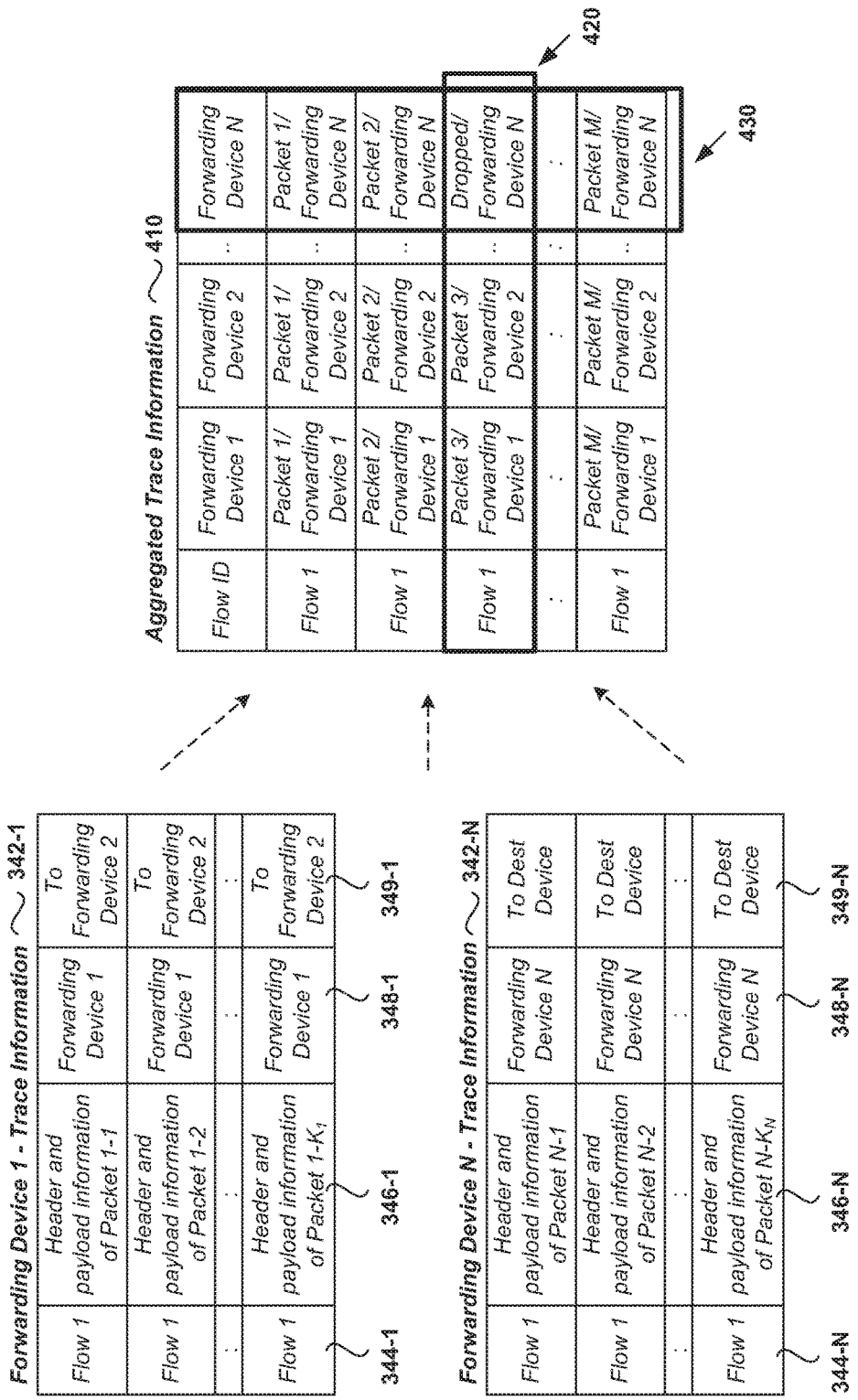
FIG. 4 is a schematic diagram of example aggregated trace information generated based on trace information from forwarding devices.

FIG. 4 is a schematic diagram of example aggregated trace information 410 generated by SDN controller device 210 based on trace information 342 from forwarding devices 220. In this example, SDN controller device 210 receives trace information 342 from Forwarding Devices 1 to N, as represented as 342-1 to 342-N respectively (not all shown for simplicity).

In the example in FIG. 4, trace information 342-1 from Forwarding Device 1 is associated with Flow 1, and includes Flow ID=1 (see 344-1), header and payload information of $K_1$ packets labelled 1-1 to 1-$K_1$ (see 346-1), Device ID=1 (see 348-1) and direction (see 349-1). Similarly, trace information 342-N from Forwarding Device N is also associated with Flow 1, and includes Flow ID=1 (see 344-N), header and payload information of $K_N$ packets labelled N-1 to N-$K_N$ (see 346-N), Device ID=N (see 348-N) and direction (see 349-N). Since forwarding devices 220 may receive different numbers of packets associated with Flow 1 within a trace duration set by SDN controller device 210, values $K_1$ to $K_N$ may be different.

To generate aggregated trace information 410, SDN controller device 210 compares trace information 342-1 to 342-N from Forwarding Devices 1 to N to identify, inter alia, forwarding devices 220 that processed a particular packet (e.g., Forwarding Devices 1 to N processed Packet 1), or different packets processed by a particular forwarding device 220 (e.g., Packets 1 to N are processed by Forwarding Device 1), or both.

For example, SDN controller device 210 may identify a particular packet (e.g., Packet 1) based on header and payload information from a particular device (e.g., 346-1 from Forwarding Device 1), which may then be mapped to header and payload information from another device (e.g., 346-2 from Forwarding Device 2). This process is repeated for other devices (e.g., Forwarding Devices 3 to N) to trace a path through which the same packet is forwarded.

Since header information of packet 332 may be updated by forwarding devices 220 as it is forwarded, its payload information generally provides a more accurate indication as to whether two packets (e.g., Packet 1-1 processed at Forwarding Device 1 and Packet N-1 processed at Forwarding Device N) are the same. For example, the checksum of Packet 1-1 may be compared against the checksum of Packet N-1 to verify whether they are the same packet.

Once a particular packet (e.g., Packet 1) is identified, SDN controller device 210 may determine which forwarding devices 220 (e.g., Forwarding Devices 1 to N) have processed that particular packet (e.g., Packet 1) based on device IDs (see 348-1 to 348-N). Further, based on direction (see 349-1 to 349-N), SDN controller device 210 may then determine which path the packet (e.g., Packet 1) is forwarded, and whether it is forwarded or dropped at different forwarding devices 220 along the path. For example, as indicated at 420, Packet 3 is forwarded along a path defined by Forwarding Devices 1 to N. Also, Packet 3 is forwarded by Forwarding Devices 1 to (N-1) before being dropped at Forwarding Device N.

Similarly, SDN controller device 210 may determine packets processed by a particular forwarding device 220 (e.g., Forwarding Device N) once different packets are identified. For example, as indicated at 430, based on header and payload information of different packets 346-1 to 346-N, SDN controller device 210 may determine that Forwarding Device N has processed Packet 1 to Packet M of Flow 1, including forwarding Packet 1 and Packet 2 but dropping Packet 3.

Computing Devices

Figure 5:
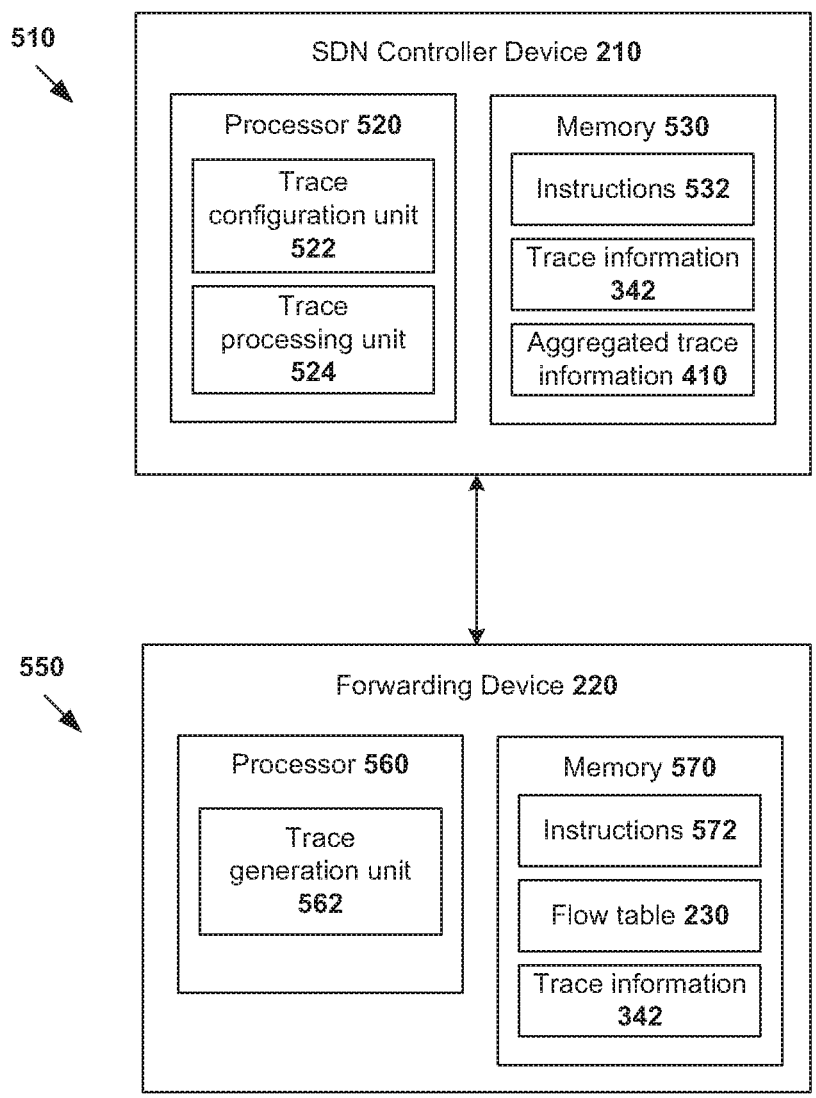
FIG. 5 is a schematic diagram of a first computing device capable of acting as an SDN controller device and a second computing device capable of acting as a forwarding device.

The above examples can be implemented by hardware (including hardware logic circuitry), software or firmware or a combination thereof. FIG. 5 is a schematic diagram of an example system 500 that includes first computing device 510 capable of acting as SDN controller device 210 and second computing device 550 capable of acting as forwarding device 220.

First computing device 510 may include processor 520 and memory 530 that may communicate with each other via a bus (not shown for simplicity), etc. Memory 530 stores instructions 532 which, in response to execution by processor 520, cause processor 520 to perform processes described herein with reference to FIG. 1 to FIG. 4. For example, processor 520 may implement trace configuration unit 522 to configure forwarding devices 220 according to block 110 in FIG. 1 and block 310 in FIG. 3; and trace processing unit 524 to process received trace information 342 to generate aggregated trace information 410 according to blocks 120 and 130 in FIG. 1 and FIG. 4.

Second computing device 550 may include processor 560 and memory 570 that may communicate with each other via a bus (not shown for simplicity), etc. Memory 570 stores instructions 572 which, in response to execution by processor 560, cause processor 560 to perform processes described herein with reference to FIG. 1 to FIG. 4. For example, processor 560 may implement trace generation unit 562 to generate trace information 342 as described with reference to FIGS. 1 to 4.

Although not shown, first computing device 510 and second computing device 550 may each include multiple interfaces (e.g., outgoing ports and incoming ports) via which information is received or sent.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non recordable media (e.g., read-only memory (ROM), random access memory (RAM), magnetic disk storage media, optical storage media, flash memory devices, etc.)

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method for a Software-Defined Networking (SDN) controller device to perform packet tracing in an SDN environment that includes the SDN controller device and a plurality of forwarding devices configurable by the SDN controller device, the method comprising:
    configuring the plurality of forwarding devices to generate trace information of packets associated with a communication flow in the SDN environment by updating a flow table of each forwarding device to include:
    characteristic information of the communication flow, and
    an action for the forwarding device to generate the trace information if header information of a packet matches with the characteristic information;
    receiving, from the plurality of forwarding devices, trace information of packets associated with the communication flow, wherein the trace information includes header information and payload information of the packets; and
    based on the trace information, generating aggregated trace information by identifying, from the header information and payload information of the packets, particular packets associated with the communication flow that are processed by one of the plurality of forwarding devices, or a particular packet associated with the communication flow that is processed by at least two of the plurality of forwarding devices, or both.

2. The method of claim 1, wherein configuring the plurality of forwarding devices further comprises:
    setting a trace duration for the forwarding device, during which the trace information is generated by the forwarding device.

3. The method of claim 1, wherein the communication flow is from a source device to a destination device in the SDN environment, and the characteristic information is associated with the source device and destination device and comprises at least one of the following:
    source and destination Internet Protocol (IP) addresses; source and destination Media Access Control (MAC) addresses; source and destination port numbers of a transport layer protocol; and IP version.

4. The method of claim 3, wherein:
    the header information of each of the packets matches with the characteristic information and comprises at least one of the following: source and destination Internet Protocol (IP) addresses; source and destination Media Access Control (MAC) addresses; source and destination port numbers of a transport layer protocol; and IP version; and
    the payload information in the trace information comprises a copy of payload information of each of the packets.

5. The method of claim 1, wherein the trace information received from each forwarding device further comprises at least one of:
    an identifier of the communication flow, an identifier of the forwarding device and a forwarding direction of each packet.

6. The method of claim 5, wherein the plurality of forwarding devices include a first forwarding device and a second forwarding device and generating aggregated trace information further comprises:
    comparing first header information and first payload information from the first forwarding device and second header information and second payload information from the second forwarding device to identify the particular packet; and
    identifying the first forwarding device and second forwarding device that processed the particular packet based on respective identifiers of the first forwarding device and second forwarding device, and the forwarding direction of the particular packet.

7. The method of claim 5, wherein the plurality of forwarding devices include a first forwarding device and a second forwarding device and generating aggregated trace information further comprises:
    comparing first header information and first payload information from the first forwarding device and second header information and second payload information from the second forwarding device; and
    based on the comparison, performing one or more of the following:
        identifying first packets associated with the communication flow based on the first header information and first payload information, and the first forwarding device that processed the first packets based on an identifier of the first forwarding device; and
        identifying second packets associated with the communication flow based on the second header information and second payload information, and the second forwarding device that processed the packets based on an identifier of the second forwarding device.

8. The method of claim 1, wherein the plurality of forwarding devices are configured using one of the following SDN protocols:

OpenFlow protocol (OFP); CLIs (Command-line Interfaces); NETCONF (Network Configuration Protocol); NETCONF (Yang Schema); SNMP (Simple Network Management Protocol); XMPP (Extensible Messaging and Presence Protocol); OpenStack; virtualization software APIs (Application Programming Interfaces); OF-Config (OpenFlow Management and Configuration Protocol); and Secure Shell (SSH).

9. A non-transitory computer-readable storage medium that includes a set of instructions which, in response to execution by a processor of a Software-Defined Networking (SDN) controller device in an SDN environment, causes the processor to perform packet tracing, comprising:

configuring the plurality of forwarding devices to generate trace information of packets associated with a communication flow in the SDN environment by updating a flow table of each forwarding device to include:

characteristic information of the communication flow, and an action for the forwarding device to generate the trace information if header information of a packet matches with the characteristic information;

receiving, from the plurality of forwarding devices, trace information of packets associated with the communication flow, wherein the trace information includes header information and payload information of the packets; and based on the trace information, generating aggregated trace information by identifying, from the header information and payload information of the packets, particular packets associated with the communication flow that are processed by one of the plurality of forwarding devices, or a particular packet associated with the communication flow that is processed by at least two of the plurality of forwarding devices, or both.

10. The non-transitory computer-readable storage medium of claim 9, wherein configuring the plurality of forwarding devices further comprises:

setting a trace duration for the forwarding device, during which the trace information is generated by the forwarding device.

11. The non-transitory computer-readable storage medium of claim 9, wherein the communication flow is from a source device to a destination device in the SDN environment, and the characteristic information is associated with the source device and destination device and comprises at least one of the following:

source and destination Internet Protocol (IP) addresses; source and destination Media Access Control (MAC) addresses; source and destination port numbers of a transport layer protocol; and IP version.

12. The non-transitory computer-readable storage medium of claim 11, wherein:

the header information of each of the packets matches with the characteristic information and comprises at least one of the following: source and destination Internet Protocol (IP) addresses; source and destination Media Access Control (MAC) addresses; source and destination port numbers of a transport layer protocol; and IP version; and the payload information in the trace information comprises a copy of payload information of each of the packets.

13. The non-transitory computer-readable storage medium of claim 9, wherein the trace information received from each forwarding device further comprises at least one of:

an identifier of the communication flow, an identifier of the forwarding device and a forwarding direction of each packet.

14. The non-transitory computer-readable storage medium of claim 13, wherein the plurality of forwarding devices include a first forwarding device and a second forwarding device and generating aggregated trace information further comprises:

comparing first header information and first payload information from a first forwarding device and second header information and second payload information from a second forwarding device to identify the particular packet; and identifying the first forwarding device and second forwarding device that processed the particular packet based on respective identifiers of the first forwarding device and second forwarding device, and the forwarding direction of the particular packet.

15. The non-transitory computer-readable storage medium of claim 13, wherein the plurality of forwarding devices include a first forwarding device and a second forwarding device and generating aggregated trace information further comprises:

comparing first header information and first payload information from a first forwarding device and second header information and second payload information from a second forwarding device; and based on the comparison, performing one or more of the following:

identifying first packets associated with the communication flow based on the first header information and first payload information, and the first forwarding device that processed the first packets based on an identifier of the first forwarding device; and identifying second packets associated with the communication flow based on the second header information and second payload information, and the second forwarding device that processed the packets based on an identifier of the second forwarding device.

16. The non-transitory computer-readable storage medium of claim 9, wherein the plurality of forwarding devices are configured using one of the following SDN protocols:

OpenFlow protocol (OFP); CLIs (Command-line Interfaces); NETCONF (Network Configuration Protocol); NETCONF (Yang Schema); SNMP (Simple Network Management Protocol); XMPP (Extensible Messaging and Presence Protocol); OpenStack; virtualization software APIs (Application Programming Interfaces); OF-Config (OpenFlow Management and Configuration Protocol); and Secure Shell (SSH).

17. A method for a forwarding device, being a first forwarding device, to perform packet tracing in a Software-Defined Networking (SDN) environment with a plurality of forwarding devices that include the first forwarding device and at least one second forwarding device, wherein the first forwarding device is configurable by an SDN controller device, and the method comprises:

based on configuration information received from the SDN controller device, updating a flow table to generate trace information of packets associated with a communication flow in the SDN environment, wherein the flow table includes:

characteristic information of the communication flow, and
an action for the first forwarding device to generate the trace information if header information of a packet matches with the characteristic information;
in response to receiving packets associated with the communication flow, generating trace information comprising header information and payload information of the received packets according to the flow table; and
sending the trace information to the SDN controller device such that trace information from the first forwarding device is aggregated with trace information from the at least one second forwarding device for the SDN controller to generate aggregated trace information by identifying, from the header information and payload information of the packets, particular packets associated with the communication flow that are processed by one of the plurality of forwarding devices, or a particular packet associated with the communication flow that is processed by at least two of the plurality of forwarding devices, or both.

18. A non-transitory computer-readable storage medium that includes a set of instructions which, in response to execution by a processor of a first forwarding device in a Software-Defined Networking (SDN) environment with a plurality of forwarding devices that include the first forwarding device and at least one second forwarding device, causes the processor to perform packet tracing, comprising:

based on configuration information received from the SDN controller device, updating a flow table to generate trace information of packets associated with a communication flow in the SDN environment, wherein the flow table includes:

characteristic information of the communication flow, and
an action for the first forwarding device to generate the trace information if header information of a packet matches with the characteristic information;
in response to receiving packets associated with the communication flow, generating trace information comprising header information and payload information of the received packets according to the flow table; and
sending the trace information to the SDN controller device such that trace information from the first forwarding device is aggregated with trace information from the at least one second forwarding device for the SDN controller to generate aggregated trace information by identifying, from the header information and payload information of the packets, particular packets associated with the communication flow that are processed by one of the plurality of forwarding devices, or a particular packet associated with the communication flow that is processed by at least two of the plurality of forwarding devices, or both.

* * * * *